UNITED STATES PATENT OFFICE.

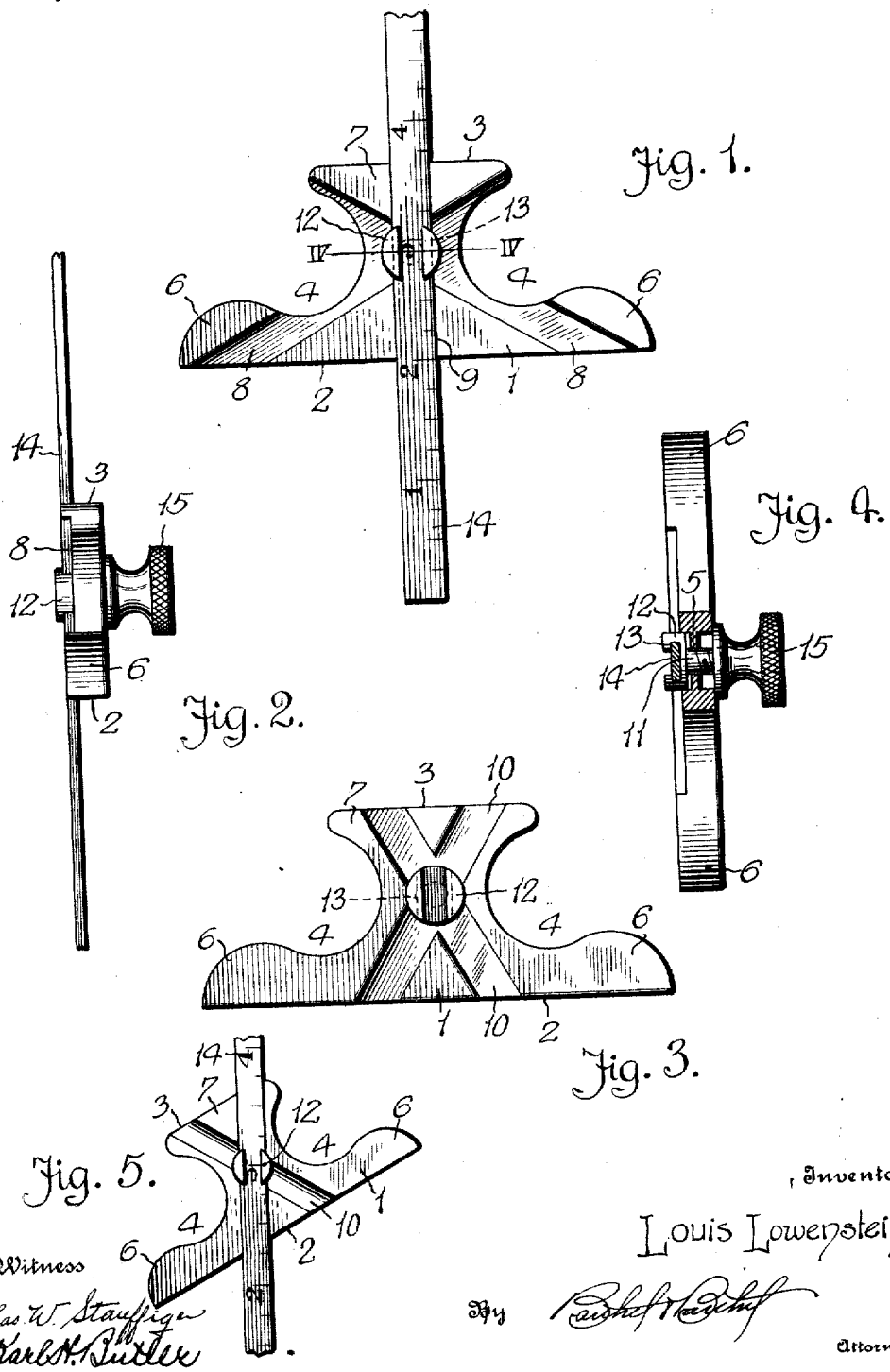

LOUIS LOWENSTEIN, OF DETROIT, MICHIGAN.

DEPTH ANGLE-GAGE.

1,295,180.  Specification of Letters Patent.  Patented Feb. 25, 1919.

Application filed May 16, 1918. Serial No. 234,865.

*To all whom it may concern:*

Be it known that I, LOUIS LOWENSTEIN, a citizen of the United States of America, residing at Detroit, in the county of Wayne and State of Michigan, have invented certain new and useful Improvements in Depth Angle-Gages, of which the following is a specification, reference being had therein to the accompanying drawings.

This invention relates to a depth gage, and the object of my invention is to furnish such a gage with angle grooves so that the instrument may be used as a bevel gage.

I attain the above object by a novel mechanical construction that will be hereinafter described and then claimed, and reference will now be had to the drawing, wherein—

Figure 1 is a front elevation of the depth gage;

Fig. 2 is a side elevation of the same;

Fig. 3 is a rear elevation of the gage body;

Fig. 4 is a cross sectional view taken on the line IV—IV of Fig. 1, and

Fig. 5 is a view similar to Fig. 3, showing the scale in position.

In the drawing, the reference numeral 1 denotes a gage body having parallel side faces, straight edges 2 and 3, finger recesses 4, and a transverse opening 5. The shape of the gage body is such that it may be considered as having opposed legs 6 providing the straight edge 2 and a head 7 providing the straight edge 3, said head serving as a handle piece for manipulating the gage body.

The front and rear parallel faces of the gage body, at the opening 5, are provided with interesecting grooves 8, 9 and 10. The grooves 9 aline in the front face of the gage body and are disposed at a right angle to the straight edges 2 and 3. The grooves 8 are also in the front face of the gage body and are disposed at sixty degrees relative to the grooves 9, the said grooves 8 being formed in the legs 6 and portions of the head 7.

The grooves 10 are in the rear face of the gage body and are thirty degree grooves, as shown in Fig. 3.

In the opening 5 of the gage body is a screw 11 provided with a head 12 and said head has a slot 13 adapted to receive a flat gage or scale 14. The threaded end of the screw 11 has a knurled nut 15 which may be tightened against a face of the gage body to hold the scale 14 in engagement with the other face of the gage body. The scale 14 is adapted to slide in the slotted screw head 12 and is also adapted to fit in the grooves 8, 9 and 10. By loosening the nut 15, the scale 14 may be shifted from the grooves 9 to the grooves 8, or by removing the nut 15 the parts may be reversed so that the scale 14 may be used in the grooves 10. With the scale 14 in the grooves 9 the instrument may be used as a depth gage, and with the scale in either of the grooves 8 or 10, the instrument may be used as a bevel gage, thus combining two instruments into a simple and durable mechanics' instrument of precision.

It is thought that the utility of the instrument will be apparent without further description, and while in the drawing there is illustrated a preferred embodiment of my invention, it is to be understood that the structural elements are susceptible to such variations and modifications as fall within the scope of the appended claims.

What I claim is:—

1. A gage of the type described comprising a body having straight edges and flat faces provided with intersecting grooves, a scale adapted to fit in the grooves of said body, a detachable screw in said body, a slotted head carried by said screw and adapted to receive said scale, and a nut on said screw adapted to bind against one face of said gage body and hold said scale in grooves of the other face of said gage body.

2. A gage of the type described comprising a body having straight edges and finger recesses providing legs and a head, said body having the faces thereof provided with intersecting grooves extending into the legs and head of said body, a detachable screw carried by said body, a slotted head at one end of said screw, a scale slidable in the slotted head of said screw and adapted to fit in either of the grooves of said gage body, and a nut on said screw against said gage body adapted to fix said scale relative to said gage body.

3. As a new article of manufacture, a depth gage having faces thereof provided with angularly disposed intersecting grooves adapted to receive the scale of said depth gage so that said gage may be used as a bevel gage.

In testimony whereof I affix my signature in the presence of two witnesses.

LOUIS LOWENSTEIN.

Witnesses:
 KARL H. BUTLER,
 ANNA M. DORR.

Copies of this patent may be obtained for five cents each, by addressing the "Commissioner of Patents, Washington, D. C."